US009358759B2

(12) United States Patent
Lee et al.

(10) Patent No.: US 9,358,759 B2
(45) Date of Patent: Jun. 7, 2016

(54) MULTILAYERED ELASTIC LAMINATES WITH ENHANCED STRENGTH AND ELASTICITY AND METHODS OF MAKING THEREOF

(71) Applicant: Kimberly-Clark Worldwide, Inc., Neenah, WI (US)

(72) Inventors: WanDuk Lee, Appleton, WI (US); Peiguang Zhou, Appleton, WI (US); Davis Dang Hoang Nhan, Appleton, WI (US); Alphonse Carl DeMarco, Greenville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 14/475,784

(22) Filed: Sep. 3, 2014

(65) Prior Publication Data

US 2015/0174869 A1    Jun. 25, 2015

Related U.S. Application Data

(63) Continuation-in-part of application No. 14/134,755, filed on Dec. 19, 2013, and a continuation-in-part of application No. 14/145,500, filed on Dec. 31, 2013, and a continuation-in-part of application No. 14/230,741, filed on Mar. 31, 2014.

(51) Int. Cl.

| | |
|---|---|
| *C08K 3/34* | (2006.01) |
| *B32B 37/00* | (2006.01) |
| *B32B 27/08* | (2006.01) |
| *B32B 7/02* | (2006.01) |
| *B32B 27/32* | (2006.01) |
| *B32B 25/16* | (2006.01) |
| *B32B 27/36* | (2006.01) |
| *B32B 23/08* | (2006.01) |
| *B32B 5/02* | (2006.01) |
| *B32B 27/12* | (2006.01) |
| *B32B 27/20* | (2006.01) |
| *B32B 37/14* | (2006.01) |
| *B32B 37/15* | (2006.01) |
| *B32B 38/00* | (2006.01) |

(52) U.S. Cl.
CPC ............... *B32B 27/08* (2013.01); *B32B 5/022* (2013.01); *B32B 7/02* (2013.01); *B32B 23/08* (2013.01); *B32B 25/16* (2013.01); *B32B 27/12* (2013.01); *B32B 27/20* (2013.01); *B32B 27/32* (2013.01); *B32B 27/325* (2013.01); *B32B 27/36* (2013.01); *B32B 37/144* (2013.01); *B32B 37/153* (2013.01); *B32B 2038/0028* (2013.01); *B32B 2250/03* (2013.01); *B32B 2264/10* (2013.01); *B32B 2274/00* (2013.01); *B32B 2307/51* (2013.01); *B32B 2555/02* (2013.01); *Y10T 428/24942* (2015.01)

(58) Field of Classification Search
CPC .......... B32B 27/08; B32B 7/02; B32B 27/32; B32B 27/325; B32B 25/16; B32B 27/36; B32B 23/08; B32B 5/022; B32B 27/12; B32B 27/20; B32B 37/153; B32B 38/0012; B32B 2250/03; B32B 2274/00; B32B 2307/51; B32B 2264/10; B32B 2555/02; B32B 2038/0028
USPC ....................................................... 524/445
See application file for complete search history.

(56) References Cited

U.S. PATENT DOCUMENTS

| | | | |
|---|---|---|---|
| 2,531,396 | A | 11/1950 | Carter |
| 2,957,512 | A | 10/1960 | Wade et al. |
| 3,953,638 | A | 4/1976 | Kemp |
| 4,081,502 | A | 3/1978 | Blumel et al. |
| 4,197,377 | A | 4/1980 | Bohm et al. |
| 4,259,220 | A | 3/1981 | Bunnelle et al. |
| 4,375,448 | A | 3/1983 | Appel et al. |
| 4,494,278 | A | 1/1985 | Kroyer et al. |
| 4,514,345 | A | 4/1985 | Johnson et al. |
| 4,525,407 | A | 6/1985 | Ness |
| 4,528,239 | A | 7/1985 | Trokhan |
| 4,606,964 | A | 8/1986 | Wideman |
| 4,640,810 | A | 2/1987 | Laursen et al. |
| 4,652,487 | A | 3/1987 | Morman |
| 4,657,802 | A | 4/1987 | Morman |
| 4,663,220 | A | 5/1987 | Wisneski et al. |
| 4,789,699 | A | 12/1988 | Kieffer et al. |

(Continued)

FOREIGN PATENT DOCUMENTS

| | | |
|---|---|---|
| EP | 0682678 B1 | 12/1998 |
| JP | 8188950 A | 7/1996 |
| KR | 100918290 B1 | 9/2009 |
| KR | 1020110076494 A | 7/2011 |
| KR | 1020120116160 A | 10/2012 |
| WO | 9418263 A | 8/1994 |
| WO | 9829239 A1 | 7/1998 |
| WO | 9925912 A1 | 5/1999 |

OTHER PUBLICATIONS

Non-final Office action issued for U.S. Appl. No. 14/134,755 (Nov. 24, 2014).

(Continued)

*Primary Examiner* — Hui Chin
(74) *Attorney, Agent, or Firm* — Armstrong Teasdale LLP

(57) ABSTRACT

Stronger elastic laminates, as well as methods of preparing the laminates, are disclosed herein. Particularly, the present disclosure is directed to multilayered elastic laminates including a thermoplastic elastomeric film layer and a plastic layer coextruded together, and further, a facing material laminated to the thermoplastic elastomeric film layer. The laminates are stretched and then relaxed. The prepared laminates have enhanced overall strength and elasticity while having a soft, cloth-like feel, and are prepared at a lower cost.

19 Claims, 1 Drawing Sheet

(56) References Cited

U.S. PATENT DOCUMENTS

| | | | |
|---|---|---|---|
| 4,880,682 A | 11/1989 | Hazelton et al. |
| 4,939,016 A | 7/1990 | Radwanski et al. |
| 5,098,522 A | 3/1992 | Smurkoski et al. |
| 5,260,171 A | 11/1993 | Smurkoski et al. |
| 5,275,700 A | 1/1994 | Trokhan |
| 5,328,565 A | 7/1994 | Rasch et al. |
| 5,334,289 A | 8/1994 | Trokhan et al. |
| 5,334,446 A | 8/1994 | Quantrille et al. |
| 5,344,691 A | 9/1994 | Hanschen et al. |
| 5,354,597 A | 10/1994 | Capik et al. |
| 5,376,430 A | 12/1994 | Swenson et al. |
| 5,389,202 A | 2/1995 | Everhart et al. |
| 5,431,786 A | 7/1995 | Rasch et al. |
| 5,496,624 A | 3/1996 | Stelljes, Jr. et al. |
| 5,500,277 A | 3/1996 | Trokhan et al. |
| 5,514,523 A | 5/1996 | Trokhan et al. |
| 5,527,171 A | 6/1996 | Soerensen |
| 5,554,467 A | 9/1996 | Trokhan et al. |
| 5,566,724 A | 10/1996 | Trokhan et al. |
| 5,624,790 A | 4/1997 | Trokhan et al. |
| 5,628,741 A | 5/1997 | Buell et al. |
| 5,628,876 A | 5/1997 | Ayers et al. |
| 5,733,617 A | 3/1998 | Baduel |
| 5,800,903 A | 9/1998 | Wood et al. |
| 5,804,021 A | 9/1998 | Abuto et al. |
| 5,814,413 A | 9/1998 | Beerwart |
| 5,861,074 A | 1/1999 | Wu |
| 5,882,769 A | 3/1999 | McCormack et al. |
| 5,885,908 A | 3/1999 | Jaeger et al. |
| H001798 H | 7/1999 | Modic |
| H001808 H | 10/1999 | Djiauw et al. |
| 6,057,024 A | 5/2000 | Mleziva et al. |
| 6,372,067 B1 | 4/2002 | Kobayashi et al. |
| 6,384,123 B1 | 5/2002 | Young |
| 6,436,529 B1 | 8/2002 | Deeb et al. |
| 6,481,483 B1 | 11/2002 | Kobayashi et al. |
| H002096 H | 1/2004 | Erderly et al. |
| 6,682,803 B2 | 1/2004 | McCormack et al. |
| 6,794,024 B1 | 9/2004 | Walton et al. |
| 7,078,089 B2 | 7/2006 | Ellis et al. |
| 7,291,382 B2 | 11/2007 | Krueger et al. |
| 7,498,282 B2 | 3/2009 | Patel et al. |
| 7,799,418 B2 | 9/2010 | Champion |
| 7,807,593 B2 | 10/2010 | Patel et al. |
| 7,834,236 B2 | 11/2010 | Middlesworth et al. |
| 7,879,452 B2 | 2/2011 | Muslet |
| 7,910,658 B2 | 3/2011 | Chang et al. |
| 7,922,854 B2 | 4/2011 | Sabbagh et al. |
| 8,034,440 B2 | 10/2011 | Morman et al. |
| 8,167,490 B2 | 5/2012 | Hu et al. |
| 8,168,853 B2 | 5/2012 | Autran et al. |
| 2002/0016122 A1 | 2/2002 | Curro et al. |
| 2002/0088534 A1 | 7/2002 | Kobayashi et al. |
| 2002/0187304 A1 | 12/2002 | McCormack et al. |
| 2003/0017345 A1 | 1/2003 | Middlesworth et al. |
| 2003/0124309 A1 | 7/2003 | Hamulski et al. |
| 2004/0087235 A1 | 5/2004 | Morman et al. |
| 2004/0089412 A1 | 5/2004 | Topolkaraev |
| 2004/0122408 A1 | 6/2004 | Potnis et al. |
| 2004/0122409 A1 | 6/2004 | Thomas et al. |
| 2005/0043460 A1 | 2/2005 | McCormack et al. |
| 2005/0049566 A1 | 3/2005 | Vukos et al. |
| 2005/0148730 A1 | 7/2005 | Day et al. |
| 2005/0148732 A1 | 7/2005 | Thomas et al. |
| 2005/0282028 A1 | 12/2005 | Huber |
| 2006/0062980 A1 | 3/2006 | Iyer |
| 2006/0135024 A1 | 6/2006 | Thomas et al. |
| 2006/0216473 A1 | 9/2006 | Tomany et al. |
| 2006/0286386 A1 | 12/2006 | Sabbagh et al. |
| 2007/0049888 A1 | 3/2007 | Soerens et al. |
| 2007/0078222 A1 | 4/2007 | Chang et al. |
| 2007/0092704 A1 | 4/2007 | Patel et al. |
| 2007/0141303 A1 | 6/2007 | Steindorf |
| 2007/0141352 A1* | 6/2007 | Calhoun ............ A61F 13/15577 428/411.1 |
| 2007/0155900 A1 | 7/2007 | Chang et al. |
| 2007/0254176 A1 | 11/2007 | Patel et al. |
| 2007/0298262 A1 | 12/2007 | Quiram et al. |
| 2008/0003910 A1 | 1/2008 | Hughes et al. |
| 2008/0132866 A1 | 6/2008 | Siqueira et al. |
| 2008/0145670 A1 | 6/2008 | Song et al. |
| 2008/0177242 A1 | 7/2008 | Chang et al. |
| 2008/0207071 A1 | 8/2008 | Muslet et al. |
| 2009/0163361 A1 | 6/2009 | Handlin et al. |
| 2009/0258210 A1 | 10/2009 | Iyad et al. |
| 2010/0008958 A1 | 1/2010 | Mundschau et al. |
| 2010/0081353 A1 | 4/2010 | Sabbagh et al. |
| 2010/0267882 A1 | 10/2010 | Clunk et al. |
| 2011/0160687 A1 | 6/2011 | Welch et al. |
| 2012/0238162 A1 | 9/2012 | Muslet et al. |
| 2012/0277703 A1 | 11/2012 | Rhein et al. |
| 2012/0291949 A1* | 11/2012 | Thomas ............ A61F 13/15699 156/275.5 |
| 2013/0048204 A1 | 2/2013 | Chang et al. |

OTHER PUBLICATIONS

International Search Report and Written Opinion for PCT/IB2014/066729 (dated Apr. 8, 2015).

International Search Report and Written Opinion for PCT/IB2014/066731 (dated Apr. 14, 2015).

International Search Report and Written Opinion for PCT/IB2015/051661 (dated May 28, 2015).

International Search Report and Written Opinion issued for PCT/IB2015/055914 (dated Oct. 27, 2015), 9 pages.

* cited by examiner

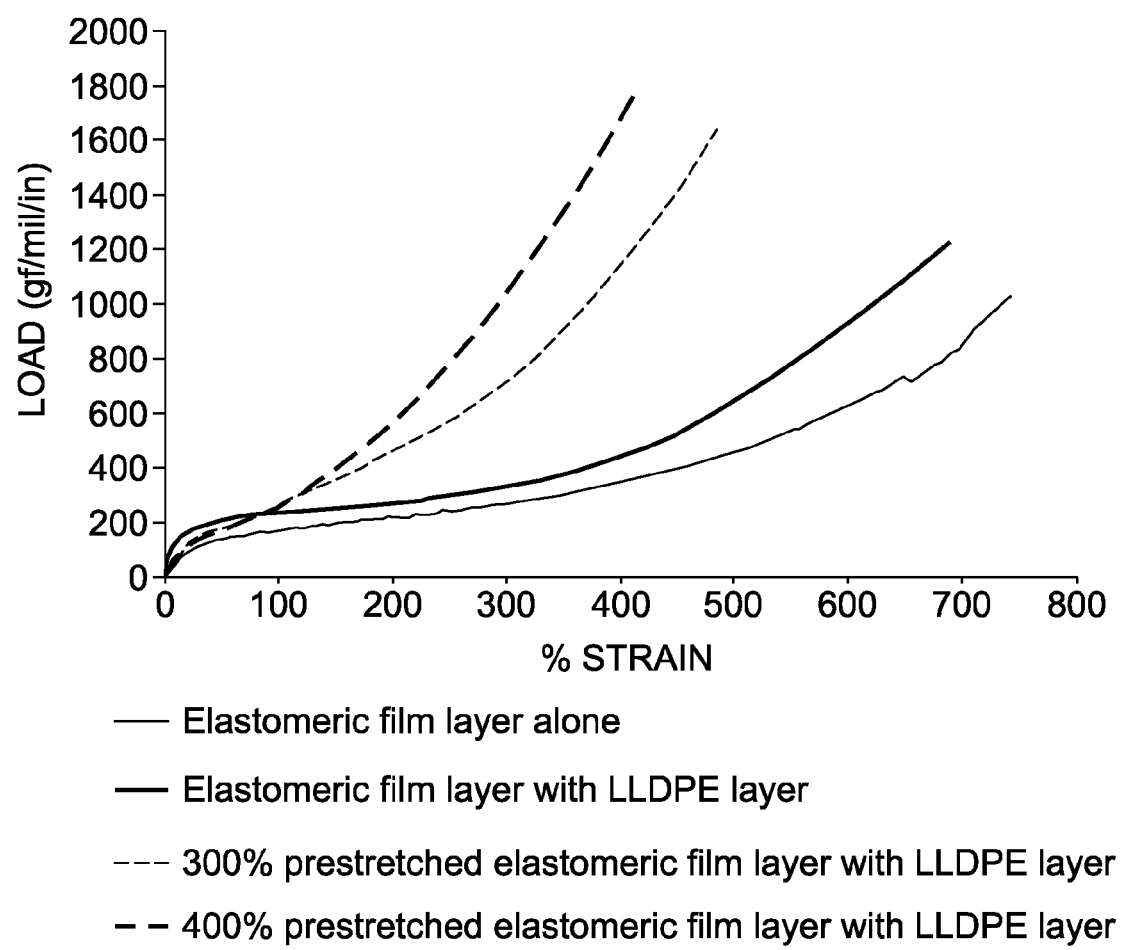

MULTILAYERED ELASTIC LAMINATES WITH ENHANCED STRENGTH AND ELASTICITY AND METHODS OF MAKING THEREOF

CROSS-REFERENCE TO RELATED APPLICATIONS

This application is a continuation-in-part application of U.S. patent application Ser. No. 14/134,755, filed Dec. 19, 2013, U.S. patent application Ser. No. 14/145,500, filed Dec. 31, 2013, and U.S. patent application Ser. No. 14/230,741, filed Mar. 31, 2014, all of which are hereby incorporated by reference in their entireties.

FIELD OF DISCLOSURE

The present disclosure is directed to stronger multilayered elastic laminates. Particularly, the present disclosure is directed to multilayered elastic laminates including a thermoplastic elastomeric film layer affixed to a facing material and a plastic layer. The layers may be coextruded together, stretched and then relaxed, providing the resulting elastic laminates with enhanced overall strength and elasticity. In some embodiments, the thermoplastic elastomeric film layer of the laminates includes a combination of polyolefin-based thermoplastic elastomers, styrenic block copolymers, and inorganic clay, and the plastic layer includes semi-crystalline or amorphous polymers. In some embodiments, the elastomeric film layers are suitably free of calcium carbonate.

Elastic laminates have conventionally been used to provide comfort and sufficient sealing functions in personal care products. For example, elastic laminates are used in side panels, ear attachments, and waist bands in diapers and training pants. In today's market, the elastic laminates are based on an elastic polymer laminated with a non-woven material as facing. These non-woven facing materials enhance the laminates' mechanical strength as elastic films are not alone typically strong enough to prevent breaking in case of overstretching the laminate by the consumer. The non-woven facing materials additionally prevent elastic film blocking during high speed processing. Further, the non-woven facing materials, made from synthetic polymer e.g., polypropylene, polyethylene, or other polyolefins, provide improved cloth-like appearance of the laminate. These non-woven facing materials, however, may account for more than 50% of the cost of the elastic laminate materials.

Accordingly, an elastic laminate that provides for a stronger elastomeric film, thus shifting the strength burden away from the facing materials, yet providing a more flexible, softer and low basis weight facing material that can be adhesively or thermally bonded to other substrate materials such to meet high speed converting requirements is highly desirable. More particularly, there is a need in the art to prepare elastic laminates having increased overall strength and elasticity that allow for a shift in strain-stress curves to a lower desirable strain region. It would further be beneficial if the elastic laminates could be prepared such to have a cloth-like appearance similar to conventional nonwoven/elastic laminates while using less nonwoven facing material or a cellulosic facing material to reduce costs. Accordingly, the present disclosure is directed to elastic laminates including elastic and plastic layers providing the elastic laminates increased strength and elasticity, and further being laminated with a facing material to provide the softer cloth-like appearance and flexible feel of conventional elastic laminate products. In some embodiments, the elastic laminate has enhanced micro-textured appearance on the surface of the plastic layer.

BRIEF DESCRIPTION OF THE DISCLOSURE

Multilayered elastic laminates having an improved mechanical strength, enhanced elasticity, and cloth-like appearance are disclosed. The laminates generally include a thermoplastic elastomeric film layer affixed to a plastic layer, and further affixed to a facing material on an opposite side from the plastic layer. In particularly suitable embodiments, the facing material is a cellulosic material. In other embodiments, the facing material can be a nonwoven material. In some suitable embodiments, a first plastic layer is further sandwiched between two thermoplastic elastomeric films.

The elastomeric film layer has an elasticity that is greater than the elasticity of the plastic layer, in other words, permanent set of the elastomeric film layer is less than the permanent set of the plastic layer. The laminates are prepared by coextruding the elastomeric film layer and plastic layer, and then stretching the laminate followed by relaxing to give the laminate desired surface features and physical properties.

More particularly, the plastic layer of the laminate provides increased overall strength to the elastic laminate. In addition, the mechanical properties of the laminate are dramatically improved by stretching and relaxation of the laminate as compared to the elastic laminate prior to stretching. These advantageous mechanical properties are the result of the plastic layer being elongated during initial stretching and then corrugated by relaxation of the thermoplastic elastomeric film. When the laminate, including the corrugated plastic layer, is elongated again, until the strain level of initial stretching, such as during use of the laminate, the corrugated plastic layer merely flattens and does not likely contribute to the tensile properties of the elastic laminate. That is, the tensile properties of the laminate until the strain level of initial stretching is mainly dominated by the elastomeric film layer, so that the laminates would keep low stress value with elongation and less permanent set after elongation, which is less than initial stretching strain. Once elongated further than initial stretching strain level of the plastic layer, stress becomes dramatically increased due to the fully flattened plastic layer, as well as the molecular orientation of the plastic layer, which results in shifting of the stress-strain curve to less elongation with 50-100% higher strength at break as compared to the thermoplastic elastomeric film alone.

It has further been found that by manipulating the polymers used, the thickness of the plastic layers, and varying the initial stretching ratio, physical behaviors such as strength and elasticity of the laminate can be controlled to enable a sufficient, and even desirable, design of elastic laminate for the specific desired end use product at a lower cost.

The elastomeric film layer is further laminated to a facing material, and in particularly suitable embodiments, a cellulosic facing material (e.g., tissue) layer, during the coextrusion process. In some embodiments, the cellulosic facing material is a weakened cellulosic facing material layer. It has been surprisingly found that by weakening the cellulosic facing material layer of the elastic laminate prior to, during, or subsequent to the lamination or bonding, and in particular, the tissue web of a tissue-elastic laminate, the laminate takes on a cloth-like appearance and softness feel at least similar to traditional elastic-nonwoven laminates. In some embodiments, the weakening is achieved by embossing the cellulosic facing layer(s) with a designated surface pattern on embossing rollers, the embossed cellulosic material layer is bonded to an elastic film through thermal bonding, adhesive bonding, pressure bonding or other means, and then the laminate is subjected to a proper stretching in one or both of the machine direction (MD) or cross direction (CD) to create the desired surface properties. In other embodiments, the weakening is achieved by wetting the laminate including the cellulosic material after the lamination process and then stretching the wetted elastic laminate including the cellulosic material in one or both of the machine direction (MD) or cross direction (CD).

The present disclosure has further found that laminating or bonding a cellulosic facing material layer to the thermoplastic elastomeric layer of the laminate thermally, adhesively or by pressure bonding is only one necessary step for preparing stretchable elastic laminates, but is not sufficient alone to give them cloth-like surface features. The pre-lamination weakening and subsequent-to-lamination stretching or the subsequent-to-lamination weakening and then stretching must also be performed properly to create improved mechanical strength and cloth-like appearance.

In other embodiments, the facing materials are other non-woven facing materials, including materials such as bonded carded webs, airlaid, coform, hydroentangled, meltblown, spunbond, and combinations thereof, as known in the non-woven arts.

Accordingly, in one aspect, the present disclosure is directed to a multilayered elastic laminate. The elastic laminate includes: a first thermoplastic elastomeric film layer having a permanent set of less than 40% after 150% elongation, the thermoplastic elastomeric film comprising a polyolefin-based thermoplastic elastomer and a styrenic block copolymer; a first plastic layer affixed to a first surface of the thermoplastic elastomeric film layer, the plastic layer having a permanent set at least 50% greater than the permanent set of the elastomeric film layer, and a facing material affixed to a second surface of the thermoplastic elastomeric film layer.

In another aspect, the present disclosure is directed to a method for preparing an elastic laminate, the method comprising: coextruding at least one thermoplastic elastomeric film layer with at least one plastic layer at a first surface of the at least one thermoplastic elastomeric film layer, and laminating at least one facing material to a second surface of the at least one thermoplastic elastomeric film layer to prepare the elastic laminate, the first thermoplastic film layer having a permanent set of less than 40% after 150% elongation and comprising a polyolefin-based thermoplastic elastomer, a styrenic block copolymer, and a strength enhancing agent, the plastic layer having a permanent set at least 50% greater than the permanent set of the elastomeric film layer, and wherein the plastic layer comprises one of a semi-crystalline or amorphous polymer; stretching the elastic laminate in one or both of the machine direction or cross direction; and relaxing the stretched elastic laminate.

DESCRIPTION OF THE FIGURES

FIG. 1 depicts a stress-strain curve for an elastomeric film layer, an elastic multilayer film made from the elastomeric film layer affixed to a linear low density polyethylene (LLDPE) layer, and an elastic multilayer film made from the elastomeric film layer affixed to a LLDPE layer that has been initially stretched 300% and 400% in the machine direction and allowed to relax.

DETAILED DESCRIPTION

Definitions

As used herein, the terms "polymer" and "polymeric" generally include but are not limited to, homopolymers, copolymers, such as for example, block, graft, random and alternating copolymers, terpolymers, etc. and blends and modifications thereof. Furthermore, unless otherwise specifically limited, the term "polymer" includes all possible spatial configurations of the molecule. These configurations include, but are not limited to isotactic, syndiotactic and random symmetries.

As used herein, the term "non-woven material" refers to a material made from synthetic polymeric fibers such as fibers of synthetic polyolefins (e.g., polypropylene, polyethylene, polybutene, and copolymers with carbons up to C12, and the like), and/or natural fibers such as cellulosic fibers, bonded together by chemical, mechanical, heat, or solvent treatment. The "non-woven material" also has a structure of individual fibers or threads which are interlaid, but not in an identifiable manner as in a knitted fabric. The "non-woven material" has been formed from many processes, such as, for example, meltblowing processes, spunbonding processes, bonded carded web processes, hydroentangling process.

"Bonded Carded Web" or "BCW" refers to a nonwoven web formed by carding processes as are known to those skilled in the art and further described, for example, in U.S. Pat. No. 4,488,928, which is incorporated herein by reference to the extent it is consistent with the present disclosure. In the carding process, one may use a blend of staple fibers, bonding fibers, and possibly other bonding components, such as an adhesive. These components are formed into a bulky ball that is combed or otherwise treated to create a substantially uniform basis weight. This web is heated or otherwise treated to activate any adhesive component, resulting in an integrated, lofty, nonwoven material.

"Coform" as used herein is a meltblown polymeric material to which fibers or other components may be added. In the most basic sense, coform may be made by having at least one meltblown die head arranged near a chute through which other materials are added to the meltblown materials as the web is formed. These "other materials" may be natural fibers, superabsorbent particles, natural polymer fibers (for example, rayon) and/or synthetic polymer fibers (for example, polypropylene or polyester). The fibers may be of staple length. Coform material may contain cellulosic material in an amount of from about 10% by weight to about 80% by weight, such as from about 30% by weight to about 70% by weight. For example, in one embodiment, a coform material may be produced containing pulp fibers in an amount of from about 40% by weight to about 60% by weight.

"Hydroentangled web" according to the present disclosure refers to a web that has been subjected to columnar jets of a fluid causing the web fibers to entangle. Hydroentangling a web typically increases the strength of the web. In one aspect, pulp fibers can be hydroentangled into a continuous filament material, such as a "spunbond web." The hydroentangled web resulting in a nonwoven composite may contain pulp fibers in an amount of from about 50% to about 80% by weight, such as in an amount of about 70% by weight. Hydroentangled composite webs as described above are commercially available from the Kimberly-Clark Corporation under the name HYDROKNIT®. Hydraulic entangling is described in, for example, U.S. Pat. No. 5,389,202 to Everhart.

"Meltblowing" as used herein is a nonwoven web forming process that extrudes and draws molten polymer resins with heated, high velocity air to form fine filaments. The filaments are cooled and collected as a web onto a moving screen. The process is similar to the spunbond process, but meltblown fibers are much finer and generally measured in microns.

"Spunbond" as used herein is a nonwoven web process in which the filaments have been extruded, drawn and laid on a moving screen to form a web. The term "spunbond" is often interchanged with "spunlaid," but the industry has conventionally adopted the spunbond or spunbonded terms to denote a specific web forming process. This is to differentiate this web forming process from the other two forms of the spunlaid web forming, which are meltblowing and flashspinning.

"Spunbond/Meltblown composite" as used herein is a laminar composite defined by a multiple-layer fabric that is generally made of various alternating layers of spunbond ("S") webs and meltblown ("M") webs: SMS, SMMS, SSMMS, etc.

Airlaid webs are formed in an air forming process in which a fibrous nonwoven layer is created. In the airlaying process, bundles of small fibers having typical lengths ranging from about 3 to about 52 millimeters (mm) are separated and entrained in an air supply and then deposited onto a forming screen, usually with the assistance of a vacuum supply. The randomly deposited fibers then are bonded to one another using, for example, hot air or a spray adhesive. The production of airlaid nonwoven composites is well defined in the literature and documented in the art. Examples include the DanWeb process as described in U.S. Pat. No. 4,640,810 to Laursen et al. and assigned to Scan Web of North America Inc, the Kroyer process as described in U.S. Pat. No. 4,494,278 to Kroyer et al. and U.S. Pat. No. 5,527,171 to Soerensen assigned to Niro Separation a/s, the method of U.S. Pat. No. 4,375,448 to Appel et al assigned to Kimberly-Clark Corporation, or other similar methods.

As used herein, the terms "weaken," "weakening," "weakened" refer to the loss of strength/rigidity within a facing material by loosening/breaking the fibrous material. Typically, the facing materials that are weakened using the methods described herein include weakened regions or gaps. For example, the facing material may be prepared or affixed to the elastomeric film layer in such a manner such to provide grooves and/or lines of fracture in the machine direction (MD) of the facing material that can be seen when stretched in the cross-direction (CD).

As used herein, the terms "machine direction" or MD refers to the direction along the length of a fabric in the direction in which it is produced. The terms "cross machine direction," "cross direction," "cross directional," or CD refers to the direction across the width of the fabric, i.e., a direction generally perpendicular to the MD.

As used herein, the term "laminate" refers to a composite structure of two or more sheet material layers that have been adhered through a bonding step, such as through adhesive bonding, thermal bonding, point bonding, pressure bonding, extrusion coating, extrusion laminating, or ultrasonic bonding. In a particularly suitable embodiment, the layers are coextruded to form the multilayered elastic laminate.

As used herein, the term "elastomeric" and "elasticity" shall be interchangeable with the term "elastic" and refers to sheet material, which can be elongated by at least 25 percent of its relaxed length and which will recover, upon release of the applied force, at least 10 percent of its elongation. It is generally desirable that the elastomeric material or composite be capable of being elongated by at least 100 percent, more desirably by at least 300 percent, and even more desirably by at least 400 percent, of its relaxed length and recover, upon release of an applied force, at least 50 percent of its elongation.

As used herein, the term "thermoplastic" refers to a polymer which is capable of being melt processed.

As used herein, the term "breathable" refers to a material which is permeable to water vapor. The water vapor transmission rate (WVTR) or moisture vapor transfer rate (MVTR) is measured in grams per square meter per 24 hours, and shall be considered equivalent indicators of breathability. The term "breathable" desirably refers to a material which is permeable to water vapor having a minimum WVTR of desirably about 100 $g/m^2/24$ hours, more suitably, greater than about 300 $g/m^2/24$ hours, and even more suitably, greater than about 1000 $g/m^2/24$ hours.

The WVTR of a fabric, in one aspect, gives an indication of how comfortable a fabric would be to wear. Often, personal care product applications of breathable materials suitably have higher WVTRs and, more typically, exceed about 1,200 $g/m^2/24$ hours, 1,500 $g/m^2/24$ hours, 1,800 $g/m^2/24$ hours, or even exceeding 2,000 $g/m^2/24$ hours.

As used herein, the terms "impermeable" or "non-breathable" refers to any material that does not fall within the definition of "breathable" above.

As used herein, the term "set" refers to retained elongation in a material sample following the elongation and recovery, i.e., after the material has been stretched and allowed to relax during a cycle test.

As used herein, the term "permanent set" is the measure of the percent (%) amount elongation at which stress becomes zero in a stress–% elongation plot. A perfect elastic material such as a spring would have a zero permanent set since the retractive curve will pass through the origin. As used herein, permanent set is measured after 150% elongation of the material. For example, a material sample with an initial gauge length of 1 inch that is stretched to 150% elongation and relaxes back to a length of about 1.2 inches has a permanent set, as defined herein, of 20%.

These measurements are performed using a strip elongation test which is substantially in accordance with the specifications in ASTM D5459-95. Specifically, the test uses two clamps each having two jaws with each jaw having a facing in contact with the sample. The clamps hold the material in the same plane usually vertically, separated by 1 inch and move the cross head at a specific rate of extension. The sample size is 4 inches by ⅜ inches (101.6 mm by 9.525 mm) with a jaw facing height of 1 inch and width of 3 inches and at a cross-head displacement rate of 20 in/min. The specimen is clamped in a MTS (Mechanical Test Systems) electromechanical test frame which has data acquisition capability. The test is conducted at ambient condition both in cross direction and machine direction (CD & MD). Results are reported as an average of at least five specimens.

The present disclosure is generally directed to multilayered elastic laminates including a thermoplastic elastomeric film layer and a plastic layer, and further including a facing material affixed to the elastomeric film layer. In some embodiments, the elastomeric film and plastic layers are coextruded together, stretched and then relaxed, and the facing material is further laminated to the elastomeric film layer during or subsequent to the coextrusion process or by using a stretch-bonded process, providing the resulting elastic laminates with enhanced overall strength and elasticity, and, in some embodiments, as well as an improved cloth-like appearance of the outer surface. Accordingly, the elastic laminates of the present disclosure can provide for stronger, more elastic regions in personal care products such as diapers, training pants, swimwear, absorbent underpants, adult incontinence products, and feminine hygiene products, such as feminine care pads, napkins, and pantiliners.

Generally, the elastic laminates of the present disclosure include a thermoplastic elastomeric film layer affixed to a plastic layer. In some embodiments, the laminates include more than one thermoplastic elastomeric film layer and/or more than one plastic layer. For example, in some embodiments, the laminate includes a first thermoplastic elastomeric film layer affixed to a first plastic layer and a second thermoplastic elastomeric film layer affixed to the first plastic layer opposite the first thermoplastic elastomeric film. Further, in other embodiments, two separate plastic layers can be affixed to or sandwiched between thermoplastic elastomeric film layers. It should be understood that more than two plastic layers and/or more than two thermoplastic elastomeric film layers, such as three, four, five, or even more plastic layers and/or thermoplastic elastomeric films can be used in the laminates without departing from the scope of the present disclosure.

The thermoplastic elastomeric film layers for use in the elastic laminates of the present disclosure have a basis weight of from about 10 gsm to about 300 gsm, including from about 20 gsm to about 150 gsm, and including from about 30 gsm to about 100 gsm.

Any of a variety of thermoplastic elastomeric polymers may be employed in the present disclosure, such as elastomeric polyesters, elastomeric polyurethanes, elastomeric polyamides, elastomeric copolymers, elastomeric polyolefins, and so forth.

In particularly suitable embodiments, the thermoplastic elastomeric film layer includes a combination of polyolefin-based thermoplastic elastomers and styrenic block copolymers.

Examples of polyolefin-based thermoplastic elastomers suitable for use in the elastomeric film layers include, among others, a crystalline polyolefin, for example, a homopolymer or a copolymer of an α-olefin having 1 to 20 carbon atoms, and including 1 to 12 carbon atoms.

Examples of crystalline polyolefins include homopolymers and copolymers described below.
(1) Ethylene homopolymer
The ethylene homopolymer may be prepared by any one of a low-pressure process and a high-pressure process.
  (2) Copolymers of ethylene and not more than 10% by mol of α-olefins other than ethylene or vinyl monomers such as vinyl acetate and ethyl acrylate; examples include ethylene octene copolymer, available as Engage 8407 or Engage 8842 (Dow Chemical, Houston, Tex.)
  (3) Propylene homopolymer; examples include polypropylene impact copolymer PP7035E4 and polypropylene random copolymer PP9574E6 (Exxon Mobil, Houston, Tex.)
  (4) Random copolymers of propylene and not more than 10% by mol of α-olefins other than propylene
  (5) Block copolymers of propylene and not more than 30% by mol of α-olefins other than propylene
  (6) 1-Butene homopolymer
  (7) Random copolymers of 1-butene and not more than 10% by mol of α-olefins other than 1-butene
  (8) 4-Methyl-1-pentene homopolymer
  (9) Random copolymers of 4-methyl-1-pentene and not more than 20% by mol of α-olefins other than 4-methyl-1-pentene Examples of the α-olefins include ethylene, propylene, 1-butene, 4-methyl-1-pentene, 1-hexene and 1-octene.

Exemplary commercially available polyolefin-based thermoplastic elastomers for use in the elastomeric film layers include VISTAMAXX™ (propylene-based elastomer, available from ExxonMobil Chemical, Houston, Tex.), INFUSE™ (olefin block copolymers, available from Dow Chemical Company, Midland, Mich.), VERSIFY™ (propylene-ethylene copolymers) such as VERSIFY™ 4200 and VERSIFY™ 4300 (Dow Chemical Company, Midland, Mich.), ENGAGE™ (ethylene octane copolymer, available from Dow Chemical, Houston, Tex.), and NOTIO 0040 and NOTIO 3560 (available from Mitsui Chemical (USA), New York, N.Y. In one particularly suitable embodiment, the polyolefin-based thermoplastic elastomer is VISTAMAXX™ 6102FL.

In an alternative embodiment, the thermoplastic elastomer may be thermoplastic ester/ether elastomers or thermoplastic polyurethanes, including PEBAX® block amide elastomers (commercially available from Arkema, France).

The thermoplastic elastomeric film layers generally include greater than 50% by weight thermoplastic elastomer, and in particular greater than 50% by weight thermoplastic polyolefin elastomer, including greater than 55% by weight, including greater than 60% by weight, including greater than 65% by weight, including greater than 70% by weight, including greater than 75%, and including greater than 80% by weight thermoplastic elastomer. In suitable embodiments, the thermoplastic elastomeric film layer includes 50% by weight thermoplastic elastomer. In yet other suitable embodiments, the thermoplastic elastomeric film layer includes about 62% by weight thermoplastic elastomer. In yet other suitable embodiments, the thermoplastic elastomeric film layer includes about 65% by weight thermoplastic elastomer. In still other suitable embodiments, the thermoplastic elastomeric film layer includes about 82% by weight, or even about 83% by weight, or even about 90% by weight, thermoplastic elastomer.

When the thermoplastic elastomeric film layer includes thermoplastic polyolefin elastomers, the thermoplastic elastomeric film layer may additionally include a styrenic block copolymer. It has unexpectedly been found that the addition of styrenic block copolymers provides improved mechanical strength to the film. Based on these improved functional and structural characteristics, the thermoplastic elastomeric film layers allow for personal care products such as disposable diapers, training pants, and the like, to be made to have improved comfort, strength and sealing functions. More particularly, in some embodiments, the thermoplastic elastomeric film layers with improved mechanical strength allow for reduced basis weight as less facing materials are used in the personal care product. Further, the thermoplastic elastomeric film layers have improved poke-through performance. As used herein, "poke-through performance" generally refers to the durability or toughness of a film to resist tearing of the film layer during use, such as the ability of the film layer to resist a user poking through the film layer with his finger.

Exemplary styrenic block copolymers for use with the thermoplastic elastomers include hydrogenated polyisoprene polymers such as styrene-ethylenepropylene-styrene (SEPS), styrene-ethylenepropylene-styrene-ethylenepropylene (SEPSEP), hydrogenated polybutadiene polymers such as styrene-ethylenebutylene-styrene (SEBS), styrene-ethylenebutylene-styrene-ethylenebutylene (SEBSEB), styrene-butadiene-styrene (SBS), styrene-isoprene-styrene (SIS), styrene-isoprene-butadiene-styrene (SIBS), hydrogenated poly-isoprene/butadiene polymer such as styrene-ethylene-ethylenepropylene-styrene (SEEPS), and hydrogenated vinyl-polyisoprene/hydrogenated polyisoprene/polystyrene triblock polymers such as commercially available as HYBRAR™ 7311 (Kuraray America, Inc., Houston, Tex.), and combinations thereof. Polymer block configurations such as diblock, triblock, multiblock, star and radial are also contemplated in this disclosure. In some instances, higher molecular weight block copolymers may be desirable. Block copolymers are available from Kraton Polymers U.S. LLC of Houston, Tex. under the designations, for example, Kraton MD6716, Kraton D1102, Kraton SIBS D1102, Kraton D1184, Kraton FG1901, and Kraton FG1924, and Septon Company of America, Pasadena, Tex. under the designations Septon 8007, Septon V9827, and Septon 9618. Another potential supplier of such polymers includes Dynasol of Spain. In particular, Kraton MD6716 SEBS triblock polymer is particularly suitable for the present disclosure.

The thermoplastic elastomeric film layers may generally include from about 15% to about 40% by weight styrenic block copolymer, including about 30% by weight styrenic block copolymer.

Surprisingly, the thermoplastic elastomeric film layers for use in the elastic laminates of the present disclosure have a tensile strength that is 40% to about 100% greater than a thermoplastic elastomeric film layer without a styrenic block copolymer. In some embodiments, the film layers have a tensile strength that is from about 50% to about 80% greater than a thermoplastic elastomeric film layer without a styrenic block copolymer.

In particularly suitable embodiments, to further improve the strength of the thermoplastic elastomeric film layers, the film layer s may additionally include a strength enhancing agent. As used herein, "strength enhancing agent" refers to a physically compounded master batch or blend of organic polymers and up to 10% by weight inorganic particles, which can reinforce the blends of thermoplastic elastomer and styrenic block copolymer or make a stronger thermoplastic elastomeric film layer in terms of increased tensile strength at break with a lower elongation at break without compromised elastic properties in terms of hysteresis and permanent set after 150% elongation.

Suitable strength enhancing agents include inorganic clays, and in suitable embodiments, include, for example, polymer grade montmorillonites, which are high purity aluminosilicate minerals referred to as phyllosilicates. Montmorillonites have a sheet-like or plate-like structure. Although their dimensions in the length and width directions can be measured in hundreds of nanometers, the mineral's thickness is only one nanometer. As a result, individual sheets have aspect ratios (length/width (l/w) or thickness/diameter (t/d)) varying from about 200 to about 1000, and in particularly suitable embodiments, from about 200 to about 400.

In some embodiments, the strength enhancing agents are inorganic clay particles such as Nanocor I.44P (available from Nanocor, Hoffman Estates, Ill.) having an average particle size of less than 20 microns in diameter, including from about 10 microns to about 15 microns in diameter, and in particularly suitably embodiments, are about 13 microns in diameter. In other embodiments, the strength enhancing agents are blends of inorganic clay and polypropylene such as Nanocor PP master batch (available from Nanocor, Hoffman Estates, Ill.).

The thermoplastic elastomeric film layers may generally include from about 2% to about 10% by weight strength enhancing agent, including from about 3% to about 8% by weight, and including from about 3% to about 5% by weight strength enhancing agent.

The thermoplastic elastomeric film layers may further include processing aids and or tackifiers associated with the elastomer polymers as known in the film-making art.

In some embodiments, the thermoplastic elastomeric film layers may be substantially free of calcium carbonate. In this context, and unless otherwise specified, the term "substantially free" means that the thermoplastic elastomeric film layers contain less than a functional amount of calcium carbonate, typically less than 1%, including less than 0.5%, including less than 0.1%, including less than 0.05%, including less than 0.015%, including less than 0.001%, and also including zero percent, by total weight of the thermoplastic elastomeric film layer.

In some embodiments, as these thermoplastic elastomeric film layers are substantially free of filler particles such as calcium carbonate, the films are air impermeable. It should be understood however, in alternative embodiments, the film layers can be prepared to be breathable.

The thermoplastic elastomeric film layers used in the elastic laminates have a permanent set, after 150% elongation, of less than 40%, including a permanent set, after 150% elongation, of less than 30%, and including a permanent set, after 150% elongation, of less than 20%.

The elastic laminates of the present disclosure further include a plastic layer. The plastic layer of the elastic laminates includes semi-crystalline or amorphous polymers. Suitable semi-crystalline polymers for use in the plastic layers include polyolefin, polyolefin-based copolymers, polyesters, and combinations thereof.

Suitably, the plastic layers include from about 5% by weight to about 50% by weight of semi-crystalline or amorphous polymer, including from about 10% by weight to about 40% by weight of semi-crystalline or amorphous polymer, and including from about 15% by weight to about 35% by weight of semi-crystalline or amorphous polymer.

It should be understood that to provide the advantageous physical properties of the elastic laminates of the present disclosure, the plastic layer should have a greater permanent set than the thermoplastic elastomeric film layer of the elastic laminate. Accordingly, the plastic layers for use in the elastic laminates of the present disclosure include a permanent set after 150% elongation of greater than 50%, including greater than 60%, including greater than 70%, including greater than 75%, including greater than 80%, including greater than 85%, and including greater than 90%.

The multilayered elastic laminates further include a facing material affixed to the thermoplastic elastomeric film layer. In one embodiment, the facing material is a nonwoven facing material, such as a bonded carded web, airlaid, coform, hydroentangled, meltblown, spunbond, and combinations thereof, as commonly used in the elastic laminate arts.

In another embodiment, the facing material is a cellulosic material, and in particular, a weakened cellulosic material. The weakened cellulosic material provides laminates with improved cloth-like appearance without the use of costly nonwoven facing materials. In one embodiment, the cellulosic material is a tissue web, as this provides substantial loft characteristics to the elastic laminate and is further water absorbent. Accordingly, when discussing the cellulosic material throughout the entirety of this application, it should be understood that the cellulosic material may suitably be tissue, however, it can alternatively be any other cellulosic material known in the art.

The basis weight of the cellulosic material may generally vary, such as from about 2 grams per square meter ("gsm") to 20 gsm, in some embodiments from about 5 gsm to about 15 gsm, and in some embodiments, from about 8 gsm to about 12 gsm. Lower basis weight cellulosic materials may be preferred in some applications. For instance, lower basis weight materials may provide even better cost saving without compromising performance.

Fibers suitable for making the cellulosic material, and particularly, the tissue web material, comprise any natural or synthetic cellulosic fibers including, but not limited to nonwoody fibers, such as cotton, abaca, kenaf, sabai grass, flax, esparto grass, straw, jute hemp, bagasse, milkweed floss fibers, bamboo fibers, algae fibers, corn stover fibers, and pineapple leaf fibers; and woody or pulp fibers such as those obtained from deciduous and coniferous trees, including softwood fibers, such as northern and southern softwood kraft fibers; hardwood fibers, such as eucalyptus, maple, birch, and aspen. Pulp fibers can be prepared in high-yield or low-yield forms and can be pulped in any known method, including kraft, sulfite, high-yield pulping methods and other known pulping methods.

In general, any process capable of forming a fibrous web can be utilized to form the cellulosic material. For example, a papermaking process can utilize creping, wet creping, double creping, embossing, wet pressing, air pressing, through-air drying, creped through-air drying, uncreped through-air drying, air laying, coform methods, as well as other steps known in the art.

Chemically treated natural cellulosic fibers can be used such as mercerized pulps, chemically stiffened or crosslinked fibers, or sulfonated fibers. For good mechanical properties in using papermaking fibers, it can be desirable that the fibers be relatively undamaged and largely unrefined or only lightly refined. While recycled fibers can be used, virgin fibers are generally useful for their mechanical properties and lack of contaminants. Mercerized fibers, regenerated cellulosic fibers, cellulose produced by microbes, and other cellulosic material or cellulosic derivatives can be used. Suitable papermaking fibers can also include recycled fibers, virgin fibers, or mixes thereof. In certain embodiments capable of high bulk and good compressive properties, the fibers can have a Canadian Standard Freeness of at least 200, more specifically at least 300, more specifically still at least 400, and most specifically at least 500.

Other papermaking fibers that can be used in the present disclosure include paper broke or recycled fibers and high yield fibers. High yield pulp fibers are those papermaking fibers produced by pulping processes providing a yield of 65% or greater, more specifically 75% or greater, and still more specifically about 75% to about 95%. Yield is the resulting amount of processed fibers expressed as a percentage of the initial wood mass. Such pulping processes include bleached chemithermomechanical pulp (BCTMP), chemithermomechanical pulp (CTMP), pressure/pressure thermomechanical pulp (PIMP), thermomechanical pulp (TMP), thermomechanical chemical pulp (TMCP), high yield sulfite pulps, and high yield Kraft pulps, all of which leave the resulting fibers with high levels of lignin. High yield fibers are well known for their stiffness in both dry and wet states relative to typical chemically pulped fibers.

In some suitable embodiments, in order to create stretchable elastic laminates with weakened regions, the cellulosic material should be weakened in a very fine pattern (e.g., weakened pattern having an interval of from about 0.125 mm to about 5 mm, including from about 0.125 mm to about 1 mm, and including from about 0.25 mm to about 0.75 mm) such that the product of modulus and thickness of the cellulosic material is three times or less than that of the thermoplastic elastomeric film layer. This is equivalent to saying that the deformation/strain energy within the film layer is at least a third of that in the cellulosic material so that the film layer plays the dominant role in the deformation process of the laminate material, which minimizes or eliminates the catastrophic fracturing and larger gaps within the surface (e.g. cellulosic) layer(s) of elastic laminate.

In one embodiment, the cellulosic material can be weakened by embossing the material using any method known in the embossing art and as further described, for example, with respect to the tissue sheets disclosed in any of the following U.S. Pat. No. 4,514,345 issued on Apr. 30, 1985, to Johnson et al.; U.S. Pat. No. 4,528,239 issued on Jul. 9, 1985, to Trokhan; U.S. Pat. No. 5,098,522 issued on Mar. 24, 1992; U.S. Pat. No. 5,260,171 issued on Nov. 9, 1993, to Smurkoski et al.; U.S. Pat. No. 5,275,700 issued on Jan. 4, 1994, to Trokhan; U.S. Pat. No. 5,328,565 issued on Jul. 12, 1994, to Rasch et al.; U.S. Pat. No. 5,334,289 issued on Aug. 2, 1994, to Trokhan et al.; U.S. Pat. No. 5,431,786 issued on Jul. 11, 1995, to Rasch et al.; U.S. Pat. No. 5,496,624 issued on Mar. 5, 1996, to Steltjes, Jr. et al.; U.S. Pat. No. 5,500,277 issued on Mar. 19, 1996, to Trokhan et al.; U.S. Pat. No. 5,514,523 issued on May 7, 1996, to Trokhan et al.; U.S. Pat. No. 5,554,467 issued on Sep. 10, 1996, to Trokhan et al.; U.S. Pat. No. 5,566,724 issued on Oct. 22, 1996, to Trokhan et al.; U.S. Pat. No. 5,624,790 issued on Apr. 29, 1997, to Trokhan et al.; and, U.S. Pat. No. 5,628,876 issued on May 13, 1997, to Ayers et al., the disclosures of which are incorporated herein by reference to the extent that they are non-contradictory herewith. In particularly suitable embodiments, the cellulosic material is embossed using a patterned metal roll against a smooth rubber roll to weaken the bonding between fibers at designated areas and to provide a desired strength of the cellulosic material. Embossing pre-weakens the cellulosic material, the pre-weakened material then fully weakens to provide desired surface properties upon stretching of the elastic laminate in one or both the MD or CD to an elongation of at least 50%, including at least 100%, including at least 150%, and including at least 200% or more.

Further stretching the elastic laminate including the cellulosic material can be accomplished using any stretching means known in the laminate art.

Typically, an embossed pattern in the cellulosic material can be configured in any manner known in the art, for example, wire-mesh patterns, dot patterns of circular pins, triangular pins, square pins, diamond pins, elliptical pins, rectangular pins or bar-shaped pins, and combinations thereof. Further, embossing provides the cellulosic material with an embossed pattern having an interval of from about 0.125 mm to about 5 mm, including from about 0.125 mm to about 1 mm, and including from about 0.25 mm to about 0.75 mm. For example, the embossing may be ridges that are spaced at intervals of from about 0.125 mm to about 5 mm, including from about 0.125 mm to about 1 mm, and including from about 0.25 mm to about 0.75 mm.

In yet other embodiments, the cellulosic material can be weakened by wetting the material (alone or in combination with the thermoplastic elastomeric film and plastic layer as an elastic laminate) prior to stretching the laminate as described below. More particularly, wetting the cellulosic material weakens hydrogen bonds, thereby allowing weakening when the cellulosic material and/or elastic laminate is stretched in one or both of the MD or CD to an elongation of at least 50%, including at least 100%, including at least 150%, and including at least 200% or more.

Any solvents known in the cellulosic material art can be used to wet the material. For example, solvents such as water or alcohol or combinations thereof can be used in the methods of the present disclosure.

Generally, when wetted, the cellulosic material is weakened by wetting to the degree that the cellulosic layer(s) contains 30 to 150% moisture or preferably 50% to 80% moisture.

Without weakening by stretching, such as through merely embossing or wetting of the cellulosic material, high strength cellulosic material would dominate the deformation process of the elastic laminate under stretching, resulting in a large catastrophic tear, e.g., greater than 10% total surface area of the laminate having gaps larger than 1 mm (measured as length of gap in the stretch direction) in size when the laminate is stretched to an elongation of 50%, 100%, and/or 150% in one or both of the MD and CD. Uncontrolled fracture/tear of the cellulosic material makes the laminate aesthetically unpleasing.

It should be understood to one skilled in the art, that while the above description of weakening and stretching referenced the facing material being a cellulosic material, the facing material could easily be a nonwoven facing material as described above, and the nonwoven facing material could be embossed and/or weakened as known in the art, without departing from the scope of the present disclosure.

To prepare the elastic laminates of the present disclosure, the thermoplastic elastomeric film layer and the plastic layer are coextruded together and then laminated with the facing material. Coextruding of the materials can be accomplished using any extrusion means known in the lamination arts.

Moreover, lamination of the facing material with the elastomeric film layer(s) of the elastic laminate can be accomplished using any conventional technique, such as extrusion laminating (as described above), thermal bonding, ultrasonic bonding, adhesive bonding, through-air bonding, calendar bonding, and the like. To enhance the durability of the facing material on the elastomeric film layer, the extrusion laminating process is preferable as this allows an increasing degree of contact between the molten film of the elastomeric film layer and fibers of the facing material, resulting in a better bond of the facing material on the elastomeric film layer. For example, the extruded elastic laminate as well as the facing material on one or both of an elastomeric film layer side(s) may be passed together through a nip formed between two rolls, both or one of which are patterned or not patterned (i.e. smooth roll). The temperature and pressure required during lamination may vary depending on many factors including, but not limited to, pattern bond area, polymer properties, fiber properties of the facing material and so on.

In one particularly suitable embodiment, when the facing material is a nonwoven facing material other than a cellulosic tissue material, the facing material may be stretch-bonded to the thermoplastic elastomeric film layer. For example, the facing material (one side or both) may be bonded to the elastomeric film layer through heated nip rolls while the elastic laminate is in a stretched condition, so that the facing material can gather and form "pleats" between the locations where it is bonded to the elastomeric film layer when it is retracted. This stretch-bond process will activate the elastic laminate before laminating with the facing material, so that additional stretching steps as described herein can be eliminated after lamination.

In yet another suitable embodiment, the facing material can be thermally bonded to a molten thermoplastic elastomeric film/plastic laminate. In one embodiment, the bonder is adjacent to the film extruder such that the facing material is contacted and bonded to the thermoplastic elastomeric film, while in a molten state, as the film exits the extruder.

In alternative embodiments, the thermoplastic elastomeric film layer and plastic layer are coextruded together, and the facing material, embossed or without embossing, can be laminated to the thermoplastic elastomeric film layer thermally, adhesively, or chemically. Typically, the bonding strength between the facing material and the thermoplastic elastomeric film layer should be sufficient to avoid delamination as known in the art.

More particularly, in one embodiment, the facing material and thermoplastic elastomeric film are thermally bonded together as known in the laminating arts. For example, in some embodiments, the facing material and thermoplastic elastomeric film are thermally bonded using patterned nip rolls having temperatures ranging from about 100° C. to about 350° C., including from about 120° C. to about 180° C., using nip load forces of from about 1000 N/m to about 20000 N/m (roughly 6-112 pounds per linear inch), and using nip surface speeds of from about 5 m/min. to about 500 m/min., including from about 20 m/min. to about 200 m/min. In suitable embodiments when the facing material is embossed, the patterned nip rolls include a pattern that is smaller in scale as compared to the embossing pattern used with to uniformly pre-weakened the facing material.

In other embodiments, the facing material and thermoplastic elastomeric film are chemically bonded together such as through the use of an adhesive composition. For example, the facing material and thermoplastic elastomeric film may be adhesively bonded using known adhesive compositions (e.g., hot melt adhesive compositions) at add-on amounts ranging from about 1 gsm to about 20 gsm, including from about 2 gsm to about 15 gsm, and including about 4 gsm to about 8 gsm, using nip load forces of from about 1000 N/m to about 20000 N/m (roughly 6-112 pounds per linear inch), and using nip surface speeds of from about 5 m/min. to about 500 m/min., including from about 20 m/min. to about 200 m/min.

In some embodiments, the adhesive composition is first applied to the thermoplastic elastomeric film prior to contacting and bonding the thermoplastic elastomeric film with the facing material.

In yet other embodiments, the facing material and thermoplastic elastomeric film are pressure bonded together. Typically, when pressure bonding, the facing material is pressure bonded with the thermoplastic elastomeric film immediately subsequent to the extrusion of the film, when the film is still in a molten state. The roller nip setting for pressure bonding of the facing material to molten elastomeric film can be either by fixed nip gap or by nip force control. For the former case, if the pattern roller(s) has pin height or depth similar to the thickness of facing layer that is measured with controlled loading of 364 kg/m$^2$ (235 grams per square inch), the nominal gap setting is about 60% to 100% of the film thickness. For instance, in laminating a 14 gsm cellulosic layer to one side of a film of basis weight of 130 gsm, the nominal thicknesses of cellulosic material and film are about 0.089 mm and 0.120 mm respectively, and a wire mesh with wire spacing of 0.282 mm and wire diameter of 0.089 mm, the gap setting between two rollers with wire mesh mounted at the surface is about 0.090 mm to 0.100 mm, which is about 75% to 85% of the film thickness 0.120 mm. For nip force control setting, the nip force is expected to range from 1000 N/m to 20000 N/m, similar to the nip force needed in the case of the thermal bonding.

Once the elastic laminate is prepared by bonding the facing material to the thermoplastic elastomeric film, the facing material may be weakened by wetting the elastic laminate to the degree that the facing layer(s) contains 30 to 150% moisture or preferably 50% to 80% moisture and stretching the wetted elastic laminate as described above in one or both of the MD or CD to an elongation of at least 50%, at least 100%, at least 150%, or even 200% or more. More particularly, the laminate is stretched from about 100% to about 600%, including from about 200% to about 500%, of its natural state. After stretching, the elastic laminate is allowed to relax back to, or close to, its natural state.

Through the stretching/relaxation process of the laminate, the plastic layer of the laminate is elongated by initial stretching and then corrugated by relaxation of the elastomeric film. Because the plastic layer is corrugated by initial stretching and relaxing of the laminate, modulus and tensile stress of the laminate is mainly dominated by the elastomeric film layer, keeping sufficient elasticity as well as low tensile stress until it is stretched to a strain range where the corrugated plastic layer becomes flat.

As noted above, once the plastic layer is elongated further than its initial stretching strain level, increased tensile strength is generated due to the molecular orientation and tension hardening of the plastic layer. Particularly, it has been discovered that the elastic laminates of the present disclosure have final strength at break of more than 50-100% greater, or even 100-200% greater, than the thermoplastic elastomeric film used alone.

Further, by initial stretching and relaxation of the elastic laminate, the strain-stress curve can be shifted to a lower strain region, such as shown in FIG. 1.

When weakening of the facing material is accomplished through use of wetting the laminate, the laminate should be dried after stretching and relaxation. Drying of the laminate can be accomplished through any drying means known in the art, including evaporation or air drying using an air dryer or impingement dryer. Typically, the dried elastic laminate will have less than 10% by weight moisture, including less than 5% by weight moisture, and including less than 2% by weight moisture.

Having described the disclosure in detail, it will be apparent that modifications and variations are possible without departing from the scope of the disclosure defined in the appended claims.

EXAMPLES

The following non-limiting Examples are provided to further illustrate the present disclosure.

Example 1

In this Example, multilayer elastic laminates, including a plastic layer sandwiched between two thermoplastic elastomeric film layers, with facing material were produced.

Particularly, the three-layer configuration of laminates with facing material were produced using a coextrusion system with three-layer feedblock. To prepare the outer thermoplastic elastomeric film layers, resins including VISTAMAXX™ 6102FL, available from Exxon Mobil, Houston, Tex.; and Kraton MD6716, available from Kraton Polymers, Houston Tex., were dry blended, 70% and 30%, respectively. The resulting mixture was fed into a 1.5" Trinity II Killion Extruder (Killion Industries, Vista, Calif.) with a temperature profile set to 185-200° C. Simultaneously, the inner core plastic layers were prepared by feeding one of Dowlex 2045, a linear low density polyethylene available from Dow Chemical, Midland, Mich., or Exact 3132, ethylene-based hexane plastomer from Exxon Mobil, Houston, Tex., into a 1.25" B Killion Extruder (Killion Industries, Vista, Calif.) with a temperature profile of 170-200° C. The three-layer molten polymers were coextruded through a 20-inch film die to make film basis weight of 30-100 gsm. Once the elastic laminates were formed from the die, 8-14 gsm of tissue, 8 gsm of meltblown, 10-18 gsm of spunbond, 8 gsm of spunbond-meltblown-spunbond (SMS) or 20 gsm of bonded carded web (BCW) were supplied on the top and bottom sides of the elastomeric film layers and then passed together through a nip formed between two rolls, which have pin pattern with 85×85 pins per square inch, to make laminates. To activate the laminates to improve elasticity, resultant laminates were fed into a groove roll system with groove center-to-center spacing of 0.130 inch and engagement depth of 0.150-0.250 inch at a speed of about 50 feet per minute. Laminates in this Example are shown in Table 1.

TABLE 1

Examples of Laminates of multilayer film (elastic/plastic/elastic configuration) with various facings

| Film composition | | Film | | Laminate | CD grooving |
|---|---|---|---|---|---|
| Outer layer | Inner layer | basis weight | Facing | Basis weight | engagement |
| 1 | 2 | 1 | (gsm) | (gsm) | (gsm) | (in) |
| Vistamxx 6102FL | Kraton MD6716 85% | Dowlex 2045 15% | 86 | Tissue (9) | 104 | 0.150-0.250 |
| Vistamxx 6102FL | Kraton MD6716 85% | Dowlex 2045 15% | 60 | meltblown (8) | 76 | 0.150-0.250 |
| Vistamxx 6102FL | Kraton MD6716 85% | Dowlex 2045 15% | 60 | spunbond (10) | 80 | 0.150-0.250 |
| Vistamxx 6102FL | Kraton MD6716 80% | Dowlex 2045 20% | 100 | BCW (20) | 140 | 0.150-0.250 |
| Vistamxx 6102FL | Kraton MD6716 85% | Exact 3132 15% | 80 | Tissue (9) | 98 | 0.150-0.250 |
| Vistamxx 6102FL | Kraton MD6716 85% | Dowlex 2045 15% | 30 | SMS (8) | 46 | 0.150-0.250 |

Example 2

In this Example, multilayer elastic laminates, including a plastic layer affixed to a thermoplastic elastomeric film layer, with facing material were produced.

Particularly, the two-layer configuration of laminates with facing material were produced using a coextrusion system with two-layer feedblock. To prepare the thermoplastic elastomeric film layer, resins including VISTAMAXX™ 6102FL, available from Exxon Mobil, Houston, Tex.; and Kraton MD6716, available from Kraton Polymers, Houston Tex., were dry blended, 70% and 30%, respectively. The resulting mixture was fed into a 1.5" Trinity II Killion Extruder (Killion Industries, Vista, Calif.) with a temperature profile set to 185-200° C. Simultaneously, the plastic layers were prepared by feeding one of Dowlex 2045, a linear low density polyethylene available from Dow Chemical, Midland, Mich., or Exact 3132, an ethylene-based hexane plastomer from Exxon Mobil, Houston, Tex., into a 1.25" B Killion Extruder (Killion Industries, Vista, Calif.) with a temperature profile of 170-200° C. The two-layer molten polymers were coextruded through a 20-inch film die to make a film basis weight of 23-100 gsm. Once the multilayer elastic film was formed from the die, 8-14 gsm of tissue, 8 gsm of meltblown, 10 gsm of spunbond, 8 gsm of SMS or 20 gsm of BCW were supplied on an elastomeric film layer side and then passed together through a nip formed between two rolls, which have pin pattern with 85×85 pins per square inch, to make laminates. To activate the laminates to get elasticity, resultant laminates were fed into a groove roll system with groove center-to-center spacing of 0.130 inch, engagement depth of 0.150-0.250 inch at a speed of about 50 feet per minute. Laminates in this Example are shown in Table 2.

TABLE 2

Examples of Laminates of multilayer film (elastic/plastic configuration) with various facings.

| Film composition | | | Film | | Laminate | CD grooving |
|---|---|---|---|---|---|---|
| Elastic layer | Plastic layer | | basis weight (gsm) | Facing (gsm) | Basis weight (gsm) | engagement (in) |
| 1 | 2 | | 1 | | | |
| Vistamxx 6102FL 70% | Kraton MD6716 30% | Dowlex 2045 | 60 | BCW (20) | 100 | 0.150-0.250 |
| Vistamxx 6102FL 70% | Kraton MD6716 30% | Dowlex 2045 | 100 | tissue (8) | 108 | 0.150-0.250 |
| Vistamxx 6102FL 85% | Kraton MD6716 15% | Exact 3132 | 23 | SMS (8) | 31 | 0.150-0.250 |
| Vistamxx 6102FL 85% | Kraton MD6716 15% | Exact 3132 | 23 | SB (10) | 33 | 0.150-0.250 |
| Vistamxx 6102FL 85% | Kraton MD6716 15% | Exact 3132 | 23 | meltblown (8) | 31 | 0.150-0.250 |
| Vistamxx 6102FL 85% | Kraton MD6716 15% | Exact 3132 | 30 | SMS (8) | 46 | 0.150-0.250 |

Example 3

In this Example, various thermoplastic elastomeric laminates were prepared and evaluated for physical properties, including elongation at break and permanent set after 150% elongation, and then compared to single layer elastomeric films.

Single layer elastomeric films were produced using 1.5" Trinity II Killion Extruder (Killion Industries, Vista, Calif.). Vistamaxx 6102FL, available from Exxon Mobil, Houston, Tex.; and Kraton MD6716, available from Kraton Polymers, Houston, Tex., were dry blended, 70% and 30%, respectively, and fed into an extruder with a temperature profile set to 185-200° C. The molten polymer was then fed into 20 inch film die to make a film with basis weight of 60-100 gsm. Once the single layer elastic film was formed from the die, 8-14 gsm of tissue facings were supplied on the top and bottom sides of the elastomeric film layer and then passed together through a nip formed between two rolls which have pin pattern with 85×85 pins per square inch to make laminates. To activate the laminates to get elasticity and break tissue layer uniformly, resultant laminates were fed into a groove roll system with groove center-to-center spacing of 0.130 inch and engagement depth of 0.150-0.250 inch at a speed of about 50 feet per minute.

A laminate of multilayer film with meltblown facing was produced as described in Example 1. The physical properties measured by the method described above are shown in Table 3. Although the multilayer elastic laminate has lower basis weight than those with a single layer of film, peak load at break is 20% higher than the single layer film laminate. By assuming same basis weight of film layer, strength at break of the multilayer elastic laminate would show at least 2600 gf, which is almost 35% higher than the single layer film based laminate. At the same time, the multilayer elastic laminates have shorter elongation at break, which is lower stretch to stop behavior, with reasonably good elasticity compared to the single layer film based laminate.

TABLE 3

Physical properties

| Film composition | | | Film basis weight (gsm) | Facing (gsm) | Physical properties | | | |
|---|---|---|---|---|---|---|---|---|
| Outer layer (85%) | | Inner layer (15%) | | | Laminate Basis weight (gsm) | Peak Load (gf) | Elongation @ Break (%) | Permanent set after 100% elongation (%) |
| 1 | | 2 | 1 | | | | | |
| Vistamxx 6102FL (70%) | Kraton MD6716 (30%) | Dowlex 2045 (100%) | 80 | meltblown (8) | 96 | 2085 | 718 | 12.6 |

TABLE 3-continued

| Film composition | | | | | Physical properties | | | |
|---|---|---|---|---|---|---|---|---|
| Outer layer (85%) | Inner layer (15%) | | Film basis weight (gsm) | Facing (gsm) | Laminate Basis weight (gsm) | Peak Load (gf) | Elongation @ Break (%) | Permanent set after 100% elongation (%) |
| 1 | 2 | 1 | | | | | | |
| Vistamxx 6102FL (70%) | Kraton MD6716 (30%) | — | 100 | Tissue (14) | 128 | 1655 | 965 | 5.4 |

What is claimed is:

1. A multilayered elastic laminate comprising:
a first thermoplastic elastomeric film layer having a permanent set of less than 40% after 150% elongation, the thermoplastic elastomeric film comprising a polyolefin-based thermoplastic elastomer, a styrenic block copolymer, and from about 3% by weight to about 8% by weight of a strength-enhancing agent, wherein the film layer is substantially free of calcium carbonate;
a first plastic layer affixed to a first surface of the thermoplastic elastomeric film layer, the plastic layer having a permanent set at least 50% greater than the permanent set of the elastomeric film layer, and
a facing material affixed to a second surface of the thermoplastic elastomeric film layer.

2. The elastic laminate as set forth in claim 1 wherein the polyolefin-based thermoplastic elastomer comprises a homopolymer or a copolymer of an α-olefin having 1 to 12 carbon atoms.

3. The elastic laminate as set forth in claim 1 wherein the styrenic block copolymer is selected from the group consisting of styrene-ethylenepropylene-styrene (SEPS), styrene-ethylenepropylene-styrene-ethylenepropylene (SEPSEP), styrene-ethylenebutylene-styrene (SEBS), styrene-ethylenebutylene-styrene-ethylenebutylene (SEBSEB), styrene-butadiene-styrene (SBS), styrene-isoprene-styrene (SIS), styrene-isoprene-butadiene-styrene (SIBS), styrene-ethylene-ethylenepropylene-styrene (SEEPS), hydrogenated vinyl-polyisoprene/hydrogenated polyisoprene/polystyrene and combinations thereof.

4. The elastic laminate as set forth in claim 1 wherein the strength-enhancing agent is inorganic clay.

5. The elastic laminate as set forth in claim 1 wherein the thermoplastic elastomeric film layer comprises greater than 50% by weight polyolefin-based thermoplastic elastomer and from about 15% by weight to about 40% by weight styrenic block copolymer.

6. The elastic laminate as set forth in claim 1 wherein the plastic layer comprises one of a semi-crystalline and amorphous polymer.

7. The elastic laminate as set forth in claim 6 wherein the semi-crystalline or amorphous polymer is selected from the group consisting of polyolefins, polyolefin-based copolymers, polyesters, and combinations thereof.

8. The elastic laminate as set forth in claim 6 wherein the plastic layer comprises from about 5% by weight to about 50% by weight semi-crystalline or amorphous polymer.

9. The elastic laminate as set forth in claim 1 wherein the facing material is a nonwoven material selected from the group consisting of bonded carded web, airlaid, coform, hydroentangled, meltblown, spunbond, and combinations thereof.

10. The elastic laminate as set forth in claim 1 wherein the facing material is a weakened cellulosic material.

11. A method for preparing an elastic laminate, the method comprising:
coextruding at least one thermoplastic elastomeric film layer with at least one plastic layer at a first surface of the at least one thermoplastic elastomeric film layer, and
laminating at least one facing material to a second surface of the at least one thermoplastic elastomeric film layer to prepare the elastic laminate, the first thermoplastic film layer having a permanent set of less than 40% after 150% elongation and comprising a polyolefin-based thermoplastic elastomer and a styrenic block copolymer, and from about 3% by weight to about 8% by weight of a strength-enhancing agent, wherein the film layer is substantially free of calcium carbonate, the plastic layer having a permanent set at least 50% greater than the permanent set of the elastomeric film layer, and wherein the plastic layer comprises one of a semi-crystalline or amorphous polymer;
stretching the elastic laminate in one of the machine direction or cross direction or both of the machine direction and cross direction; and
relaxing the stretched elastic laminate.

12. The method as set forth in claim 11 wherein the strength-enhancing agent is inorganic clay.

13. The method as set forth in claim 12 wherein the thermoplastic elastomeric film layer comprises greater than 50% by weight polyolefin-based thermoplastic elastomer, and from about 15% by weight to about 40% by weight styrenic block copolymer.

14. The method as set forth in claim 11 wherein the facing material is a cellulosic material.

15. The method as set forth in claim 14 wherein the cellulosic material is embossed.

16. The method as set forth in claim 11 wherein the facing material is a nonwoven material selected from the group consisting of bonded carded web, airlaid, coform, hydroentangled, meltblown, spunbond, and combinations thereof.

17. The method as set forth in claim 11 wherein the semi-crystalline or amorphous polymer is selected from the group consisting of polyolefins, polyolefin-based copolymers, polyesters, and combinations thereof.

18. The method as set forth in claim 17 wherein the plastic layer comprises from about 5% by weight to about 50% by weight semi-crystalline or amorphous polymer.

19. The method as set forth in claim 11 wherein the elastomeric laminate is stretched from about 100% to about 600% in the machine direction or cross direction.

* * * * *